(12) United States Patent
Lindenfelzer et al.

(10) Patent No.: US 11,773,232 B2
(45) Date of Patent: Oct. 3, 2023

(54) THERMOFORMED POLYMERIC FOAM ARTICLES AND METHODS

(71) Applicant: MuCell Extrusion, LLC, Woburn, MA (US)

(72) Inventors: Mark E. Lindenfelzer, Milton, MA (US); Simon Dominey, Gloucestershire, MA (US); Samuel Edward Dix, Newton, NH (US); Jere R. Anderson, Newburyport, MA (US)

(73) Assignee: MuCell Extrusion, LLC, Woburn, MA (US)

( * ) Notice: Subject to any disclaimer, the term of this patent is extended or adjusted under 35 U.S.C. 154(b) by 0 days.

(21) Appl. No.: 14/501,012

(22) Filed: Sep. 29, 2014

(65) Prior Publication Data
US 2016/0090458 A1    Mar. 31, 2016

(51) Int. Cl.
| | |
|---|---|
| *C08J 9/12* | (2006.01) |
| *C08J 9/36* | (2006.01) |
| *B29C 44/06* | (2006.01) |
| *B29C 44/34* | (2006.01) |
| *B29C 48/08* | (2019.01) |
| *B29K 105/04* | (2006.01) |
| *B29C 51/02* | (2006.01) |
| *B29L 31/00* | (2006.01) |
| *B29L 9/00* | (2006.01) |

(Continued)

(52) U.S. Cl.
CPC .............. *C08J 9/122* (2013.01); *B29C 44/06* (2013.01); *B29C 44/3484* (2013.01); *B29C 48/08* (2019.02); *C08J 9/36* (2013.01); *B29C 48/0017* (2019.02); *B29C 48/2526* (2019.02); *B29C 48/28* (2019.02); *B29C 48/313* (2019.02); *B29C 48/355* (2019.02); *B29C 48/834* (2019.02); *B29C 51/02* (2013.01); *B29K 2105/04* (2013.01); *B29K 2105/041* (2013.01); *B29K 2995/0063* (2013.01); *B29L 2009/00* (2013.01); *B29L 2031/712* (2013.01); *C08J 2201/03* (2013.01); *C08J 2205/044* (2013.01); *C08J 2323/02* (2013.01); *C08J 2323/12* (2013.01); *C08J 2323/14* (2013.01)

(58) Field of Classification Search
CPC .............. B29C 44/04; B29C 66/73132; B29C 45/14795; B29C 47/0042; B29C 67/2235
See application file for complete search history.

(56) References Cited

U.S. PATENT DOCUMENTS 4,419,309 A * 12/1983 Krutchen ............ B29C 44/3442
264/321
2002/0121716 A1* 9/2002 Welsh ................. B29C 44/5627
264/51

FOREIGN PATENT DOCUMENTS

WO    WO 01/36521    * 5/2001

* cited by examiner

*Primary Examiner* — Stella K Yi
(74) *Attorney, Agent, or Firm* — Wolf, Greenfield & Sacks, P.C.

(57) ABSTRACT

Thermoformed polymeric foam articles are described herein In some embodiments, the articles are made by a manufacturing method (e.g., a continuous process) which involves the extrusion and subsequent thermoforming of a blowing agent containing thermoplastic sheet. The thermoformed polymeric foam articles may have a lower density than the precursor sheet from which they are formed. In some but not all embodiments, the precursor sheet is a multi-layer sheet which includes at least one foam layer. In such embodiments, the thermoformed articles also include multiple layers and at least one foam layer.

15 Claims, 6 Drawing Sheets

(51) Int. Cl.
*B29C 48/80* (2019.01)
*B29C 48/25* (2019.01)
*B29C 48/31* (2019.01)
*B29C 48/00* (2019.01)
*B29C 48/28* (2019.01)
*B29C 48/355* (2019.01)

THERMOFORMED POLYMERIC FOAM ARTICLES AND METHODS

FIELD OF INVENTION

The present invention relates to thermoformed polymeric foam articles. In some embodiments, the articles are made by a continuous manufacturing method which involves the extrusion and subsequent thermoforming of a blowing agent containing thermoplastic sheet.

BACKGROUND OF INVENTION

Thermoforming is a well established method for forming three dimensional articles from flat polymeric sheets. These polymeric sheets may be solid or foamed. The advantages of using foamed sheet are that the material content of the finished article is lower than if solid sheet were used, with the associated benefits of reduced raw material costs, and the foamed sheet has certain desirable physical and insulating characteristics. These attributes are particularly valued in high volume, low cost applications such as food and beverage packaging. For example, there is a well known requirement for disposable cups for hot beverages to insulate the contents, and keep them warm, while maintaining the exterior at a temperature that is comfortable for the consumer to hold.

Therefore, it is desirable to have a continuous process for thermoforming foam articles, however, most of the foamed sheet produced by the prior art is not suitable for thermoforming immediately after it is foamed and requires a period of curing which may take several days. The reason that a period of curing is necessary is that on cooling after foaming the gas in the newly created cells contracts and the pressure in the cells is reduced to below atmospheric pressure. Trying to thermoform the foamed sheet while there is a low pressure in these cells may cause the cells to collapse. Therefore, a curing period is typically allowed during which time atmospheric gases diffuse into the cells and equilibrate the pressure prior to thermoforming.

Wagner (U.S. Pat. No. 5,362,436), for example, teaches the thermoforming of a cup from a polystyrene foam sheet. In this patent, Wagner specifically teaches that the quantity of residual gas in the foamed sheet should be in an amount so as to prevent secondary foaming from taking place when the sheet is heated for thermoforming. Where excess gas is present in the foam, degassing at elevated temperature (i.e. 40° C. to 50° C.) or leaving the sheet to stand, up to 20 hours where carbon dioxide is the blowing agent, is recommended. However, others such as Branch and Wardle (US 2005/0203198 A1) suggest that in certain instances, where the diffusion rate of the atmospheric gases diffusing into the cells is greater than that of the gas used for foaming diffusing out of the cells, a positive pressure may be generated during the thermoforming process which may be beneficial.

In both of the cases above, whether there is excess gas in the sheet or not, there are a number of disadvantages in having the process for the extrusion of the sheet separate from the thermoforming process. For example, there may be defects in the sheet which do not become apparent until the sheet is either foamed or thermoformed resulting in large quantities of unusable stock. In addition, where the extruded sheet is in the form of a foam, it is more difficult to reheat the core of the sheet to the temperature required for thermoforming because of the insulating nature of the foam. This may result in uneven heating of the core or over-heating of the surface of the sheet which may affect the surface appearance or physical properties of the thermoformed article. Therefore, it is desirable to have a continuous process in which the sheet is extruded and then thermoformed without interruption.

Branch (US 2014/0151919 A1) teaches a process in which a gas impregnated roll of polymer is fed continuously through a hot-air tunnel and foamed before being fed into an accumulator just ahead of the thermoformer. The accumulator allows continuous movement of the polymer in the foaming stage while the material feed stops and starts within the thermoformer with each thermoformer cycle. Alternatively, the polymer may be stopped and started in the hot-air tunnel of the foaming stage, thereby eliminating the need for the accumulator. The thermoformer cycle typically last between 2 and 30 seconds. Although the foaming and thermoforming stages described by Branch are essentially continuous, the gas impregnation of the initial polymer roll is performed in a discontinuous batch process which may take many hours to complete depending on a number of factors such as the type of polymer, the impregnating gas, the thickness of the polymer and the temperature of impregnation.

In this patent, Branch describes a number of advantages of performing the thermoforming operation relatively soon after the foaming stage and while the majority of the blowing agent gas is still retained within the sheet. In particular, in the case of carbon dioxide, the gas may lower the glass transition temperature of the polymer thereby improving the formability of the polymer; reducing cycle times, saving energy and improving part detail.

Nadella et al (U.S. Pat. No. 8,517,709) attempt to address the obvious commercial disadvantages of the discontinuous gas impregnation process used by Branch with a number of modifications to the prior art. However, none of these modifications address the discontinuity between the extrusion and thermoforming steps of the process.

Ishiwatari et al (U.S. Pat. No. 6,537,404 B1) teaches a number of methods for producing thermoplastic polyester resin foam, most of which require the usual curing period between extrusion and thermoforming. However, in one of the embodiments a continuous process for thermoforming containers is described. In this embodiment a polyethylene terephthalate sheet, foamed using nitrogen as the blowing agent, was extruded from an annular die and then slit to produce a flat sheet of 1.02 mm thickness and a density of 0.36 g/cc. This sheet then passed directly into a heating oven before being thermoformed into a container with a wall thickness between 0.45 and 0.65 mm. The thermoformed article of this process has a lower wall thickness than the thickness of the extruded sheet. The same is true of the discontinuous process of Wagner wherein a foamed sheet of 3.43 to 3.56 mm in thickness, with additional solid skins of at least 0.15 mm on either side, resulted in a wall thickness of the finished article of about 1.12 mm.

Harfmann (U.S. Pat. No. 5,985,190) teaches a method for forming low density, high melting point foam articles. In this method, a crystalline polymer resin such as polyethylene terephthalate is combined with one or more physical blowing agents to create a mixture with a blowing agent concentration sufficient to produce a theoretical sheet foam density of less than 0.4 g/cm$^3$. The mixture is extruded into a substantially uniform closed cell polymer foam sheet of density less than 0.4 g/cm$^3$ and then cooled by direct contact with a cooling surface at a surface temperature below the glass transition temperature, causing at least one of the blowing agents to condense and the foam sheet to collapse to a density of greater than 0.4 g/cm$^3$. The collapsed sheet is then heated to the forming temperature, causing the condensed blowing agent, or agents, to vaporize and the sheet can then be formed to a density of less than 0.4 g/cm$^3$. In this way it is possible to form a low density foamed article with a higher crystallinity and, therefore, temperature performance, than would have otherwise been achieved. However, in order for this method to work at least one of the physical blowing agents must have a boiling point greater than the glass transition of the polymer but lower than the forming temperature of the foam sheet, for example, the hydrocarbons used in the examples given.

Blizard (WO 01/36521 A2) teaches a process for thermoforming polyolefin foam articles in which the thermoformed article had a density of less than or equal to that of the precursor foamed sheet and a thickness of greater than or equal to that of the foamed sheet. In the examples give the polymer used is a polypropylene and the blowing agent is carbon dioxide, talc is used as the nucleating agent. While it is suggested that in-line thermoforming may be possible, no examples are given, in all the embodiments the thermoforming process is conducted separately from the extrusion process to allow time for the curing of the precursor sheet. No indication of the density reduction achievable in a continuous process, with no curing of the foam, is given.

Rolle et al (U.S. Pat. No. 6,203,751) teach the thermoforming of open containers from foamed sheet using a matched male and female tool. In this instance, in order to achieve a density reduction in the foamed container over that of the initial foamed sheet the pressure in the cavity formed between the male and female tool is reduced. This causes the foamed container to expand to fill the cavity and this reduced pressure is then maintained while the container is cooled. There is no suggestion that the density of the thermoformed container would be lower than that of the foamed sheet were a low pressure not to be applied in the matched mould.

Welsh et al (U.S. Pat. No. 6,544,450) teach a process for producing a high density thermoplastic foam sheet suitable for thermoforming. In this process a three-roll polishing stack is used to produce a thermoformable foam sheet with improved gauge (i.e. thickness) and density uniformity, both of which are desirable characteristics for reducing variability in the thermoforming process. However, Welsh et al do not suggest that there is any reduction in the density of the thermoformed article when compared to the initial foamed sheet. In the example given, the thermoplastic foam sheet is a three layer coextrusion with a central layer of polystyrene foam, foamed using carbon dioxide as the physical blowing agent, and two solid polystyrene skin layers

SUMMARY OF INVENTION

Thermoformed polymeric foam articles are described. In some embodiments, the articles are made by a continuous manufacturing method which involves the extrusion and subsequent thermoforming of a blowing agent containing thermoplastic sheet. The thermoformed polymeric foam articles may have a lower density than the precursor sheet from which they are formed.

In one aspect, a thermoformed polymeric foam article and/or method of forming an article is provided. The method includes conveying a mixture of polymeric material and blowing agent downstream in an extruder; extruding the mixture in the form of a precursor sheet; and, heating and forming the precursor sheet into a shape to form a thermoformed article including at least one foam layer. The time between step (b) and step (c) is less than one hour and the density of the thermoformed article is lower than the density of the precursor sheet.

In some embodiments, the time between step (b) and (c) is less than 30 minutes; in some embodiments, less than 10 minutes; in some embodiments, less than 5 minutes; in some embodiments, less than 1 minute; in some embodiments, less than 30 seconds; and in some embodiments, less than 10 seconds. In some embodiments, the process is continuous such that there is no stop in the process (in other words, continuous operation) between steps (b) and (c).

In one embodiment, a thermoformed polymeric foam article is formed by first conveying a stream of polymeric material and blowing agent in an extruder and then extruding this stream through a flat die to form a blowing agent containing extrudate. This extrudate is then passed though a three-roll stack, where the extrudate solidifies to produce a blowing agent containing sheet of uniform thickness. At this point only minimal expansion of the sheet will have occurred. The solid, blowing agent containing sheet is then heated, causing the sheet to foam and expand, and the foamed sheet is then thermoformed to give a foamed article of lower density than the blowing agent containing sheet. For example, the article may have a thickness of 0.25-8 mm; a density that is 70% reduced; and a cell size of less than 250 microns.

Other aspects, embodiments and features of the invention will become apparent from the following detailed description of the invention when considered in conjunction with the accompanying drawings. The accompanying figures are schematic and are not intended to be drawn to scale. In the figures, each identical, or substantially similar, component that is illustrated in various figures is represented by a single numeral or notation. For purposes of clarity, not every component is labelled in every figure. Nor is every component of each embodiment of the invention shown where illustration is not necessary to allow those of ordinary skill in the art to understand the invention. All of the patent publications incorporated herein by reference are incorporated herein by references in their entireties. In cases of conflict or inconsistency between the disclosure of an incorporated reference and the present specification, the present specification should control.

DETAILED DESCRIPTION OF THE INVENTION

Thermoformed polymeric foam articles are described herein In some embodiments, the articles are made by a manufacturing method (e.g., a continuous method) which involves the extrusion and subsequent thermoforming of a blowing agent containing thermoplastic sheet. The thermoformed polymeric foam articles may have a lower density than the precursor sheet from which they are formed. In some but not all embodiments, the precursor sheet is a multi-layer sheet which includes at least one foam layer. In such embodiments, the thermoformed articles also include multiple layers and at least one foam layer. Suitable multi-layer sheets and resulting thermoformed articles have been described in commonly-owned U.S. patent application Serial No. to be assigned, entitled "Multi-Layer Thermoformed Polymeric Foam Articles and Methods", filed on the same day as the present application, which is incorporated herein by reference in its entirety.

As described further below, the equipment and processing conditions may be controlled to form the thermoformed foam articles having desired characteristics. For example, the thermoformed foam articles may have small cell sizes and/or small cell aspect ratios. Such thermoformed foam articles can have excellent mechanical and insulation properties, while providing the materials savings associated with foam materials as compared to solid polymer. The thermoformed foam articles may be used in a variety of applications including food and beverage containers, such as cups, trays, bowls, tubs and the like, some of which may be used for heating or cooking either in a conventional oven or a microwave oven. It is further contemplated that the thermoformed foam articles of the present invention may also find application in larger articles such as refrigerator doors or luggage, where the insulating qualities or low weight of the thermoformed foam articles are particularly valued.

Figure 1:
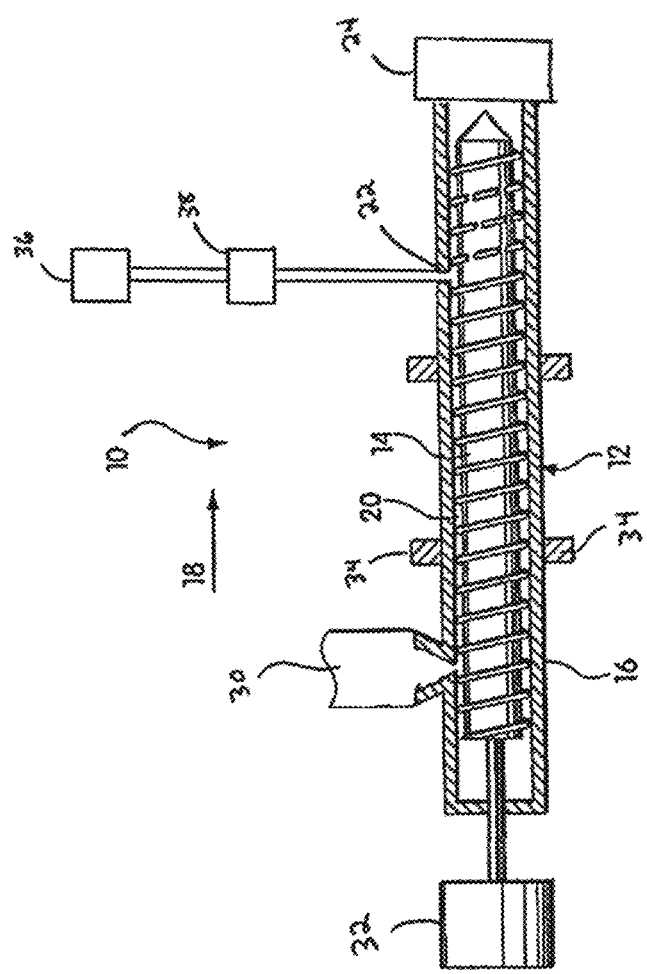
FIG. 1 shows a extrusion system according to an embodiment.
Figure 1A:
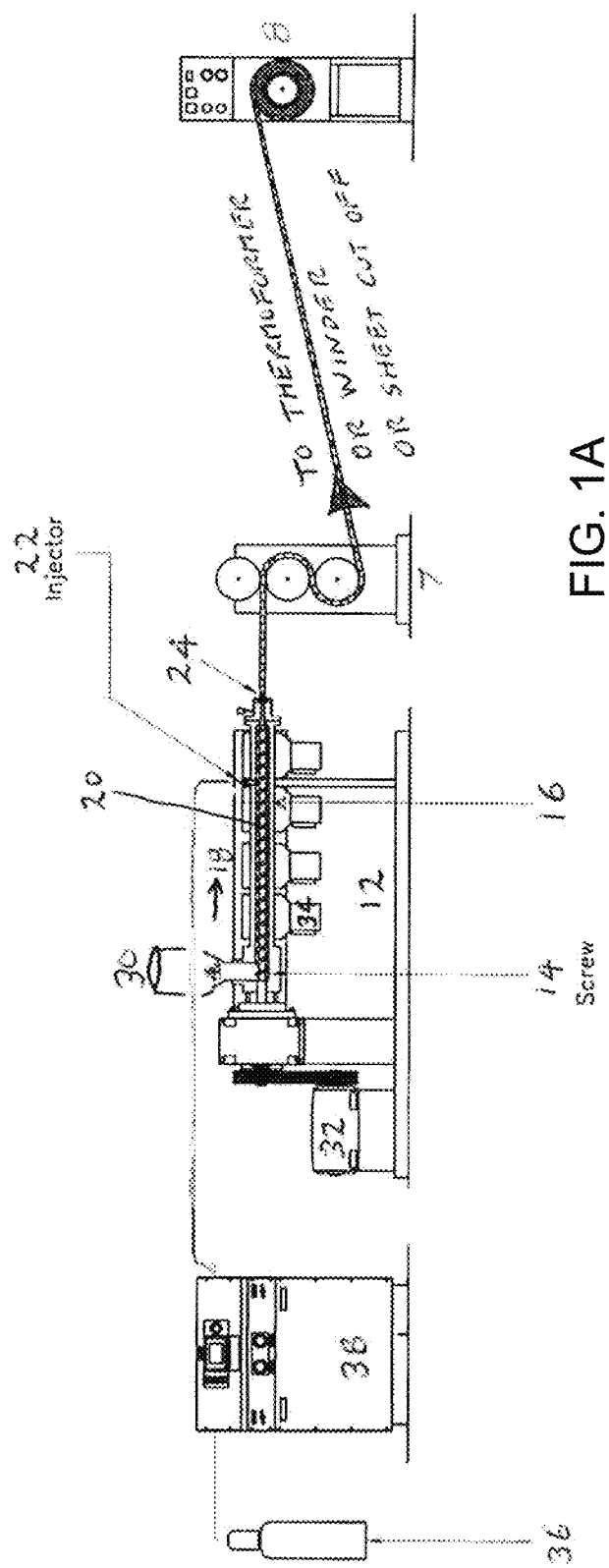
FIG. 1A shows the roll stack

Referring now to FIG. 1 and FIG. 1A, a polymer processing system 10 suitable for forming the foam layer(s) of the precursor sheet described herein is illustrated schematically. The system includes an extruder 12 which houses a screw 14 that rotates within a barrel 16 to convey, in a downstream direction 18, polymeric material in a processing space 20 between the screw and the barrel. A blowing agent is introduced into the stream of polymeric material, for example, through a blowing agent port 22. The stream of polymeric material and blowing agent is extruded through a die 24 fluidly connected to the processing space and fixed to a downstream end of the barrel. In some embodiments, the die is in the form of a flat sheet die and the extrudate from the die is fed directly into the nip of a multi-roll stack 7 to prevent or limit the expansion of the blowing agent.

Although not illustrated, when the precursor sheet includes multiple layers, a second extrusion system may be used to form one or more solid polymer layers of the precursor sheet, for example, by co-extruding such layers with the foam layer(s) through the die to form the precursor sheet.

As described further below, the precursor sheet may be fed directly in-line to a thermoformer; and, in other embodiments, the sheet may be collected and then fed directly to the thermoformer (off-line thermoforming).

It should be understood that the above depicts a representative thermoforming system though other types of thermoforming systems may also be used to produce the thermoformed foam article.

The polymeric material may be introduced into the extruder using a standard hopper 30. The screw is connected, at its upstream end, to a drive motor 32 which rotates the screw within the barrel. Positioned along the barrel are temperature control units 34. The control units can be electrical heaters, can include passageways for temperature control fluid, and or the like. Units can be used to heat a stream of polymeric material within the barrel to facilitate melting, and/or to cool the stream to control viscosity. The temperature control units can operate differently at different locations along the barrel, that is, to heat at one or more locations, and to cool at one or more different locations. Any number of temperature control units can be provided. Temperature control units can also be supplied to heat the die to which the extrusion system is connected.

In a typical process, polymeric material in pellet form is introduced into the polymeric processing space from the hopper. The polymeric material is conveyed in a downstream direction as the screw rotates. Heat and shear forces arising from the rotating screw, act to soften and melt the pellets into a uniform fluid stream substantially free of air pockets.

As noted above, the process involves using a blowing agent. In some embodiments and as shown in FIG. 1, a physical blowing agent may be introduced into the stream of polymeric material through the blowing agent port. In other embodiments, a chemical blowing agent may be used. The chemical blowing agent may be used along with, or instead, of a physical blowing agent. The chemical blowing agents may be blended with, or added to, the polymeric material pellets or otherwise introduced into the stream. A blowing agent port may not be utilized when using a chemical blowing agent. Any of a wide variety of known chemical blowing agents may be used, for example, azodicarbonamide (ADCA), oxybisbenzenesulfonylhydrazide (OBSH), p-toluenesulfonylhydrazide (TSH), benzenesulfonylhydrazide (BSH), N,N'-dinitrosopentamethylenetetramine (DNPT), p-toluenesulfonylsemicarbazide (TSS), 5-phenyltetrazole (5PT), citric acid, sodium bicarbonate, monosodium citrate, or combinations of the above.

In embodiments in which a physical blowing agent is used, the physical blowing agent can be introduced from a blowing agent source 36 connected to the blowing agent port. Any of a wide variety of physical blowing agents known to those of ordinary skill in the art such as hydrocarbons, chlorofluorocarbons (CFC), hydrofluorocarbons (HFC), hydrochlorofluorocarbons (HCFC), nitrogen, argon, carbon dioxide, and mixtures thereof, can be used. In some preferred embodiments, the source provides carbon dioxide or nitrogen, or a mixture thereof as a blowing agent. Blowing agents that are in the supercritical state in the extruder may be preferred in some embodiments, particularly supercritical carbon dioxide and nitrogen.

In some embodiments carbon dioxide is used in combination with other blowing agents, for example nitrogen, and in other embodiments carbon dioxide is used alone with no other blowing agents present. In other embodiments carbon dioxide can be used with other blowing agents so long as the other blowing agents do not materially alter the blowing process. When nitrogen is used, similarly it can be used alone, in combination with another blowing agent (e.g. carbon dioxide) that adds to or changes the blowing agent properties, or in combination with another agent that does not materially change the blowing process.

In embodiments that utilize physical blowing agents, the thermoformed articles may be substantially free of residual chemical blowing agents or by-products of chemical blowing agents. Such articles may have certain advantages in some applications, for example, where high purity is required.

A pressure and metering device 38 typically is provided between the blowing agent source and the port. The metering device can be used to meter the blowing agent so as to control the amount of the blowing agent in the polymeric stream within the extruder to maintain a level of blowing agent at a particular level. In some preferred embodiments, the device meters the mass flow rate of the blowing agent. The blowing agent is generally less than about 10% by weight of polymeric stream and blowing agent; in some embodiments, the blowing agent may be less than about 5% by weight of polymeric stream and blowing agent; in some embodiments, the blowing agent may be less than about 2.5% by weight of polymeric stream and blowing agent; and, in some embodiments, the blowing agent may be less than about 1% by weight of polymeric stream and blowing agent.

When carbon dioxide is used as a blowing agent, it may be possible in some embodiments to use relatively low amounts of blowing agent such as less than about 2.5%, or less than about 1%, by weight of polymeric stream and blowing agent. When nitrogen is used as a blowing agent, it may be possible in some embodiments to use very low amounts of blowing agent such as less than about 1.0%, less than about 0.5%, or less than about 0.1%, by weight of polymeric stream and blowing agent. In general, as described further below, use of a nucleating additive may enable lower blowing agent percentages to be used.

Although the blowing agent port can be located at any of a variety of locations along the barrel, according to some embodiments it is located just upstream from a mixing section of the screw and at a location of the screw where the screw includes unbroken flights. Blowing agent port configurations which may be suitable in some embodiments have been described in U.S. Pat. No. 6,284,810 which is incorporated herein by reference in its entirety. U.S. Pat. No. 6,284,810 also describes extrusion systems and processes which may be suitable in some embodiments. In some embodiments, one or more blowing agent ports may be utilized which include one or more orifices. However, certain systems may have a single blowing agent port and/or a single orifice.

In some embodiments, a single-phase solution of blowing agent and polymer may be formed in the polymer processing space in the extruder. Formation of a single-phase solution may be particularly conducive to forming a foam structure having small cell sizes, as described further below. The single-phase solution may be nucleated upon being extruded through the die. For example, the solution may experience a rapid pressure drop which induces nucleation when passing through the die.

It should also be understood that, in some embodiments, a mixture of blowing agent and polymer which is not a single-phase solution may be extruded through the die. Such embodiments, however, may not be as well-suited for forming small cell foams and/or foams having small aspect ratios.

Figure 2A:
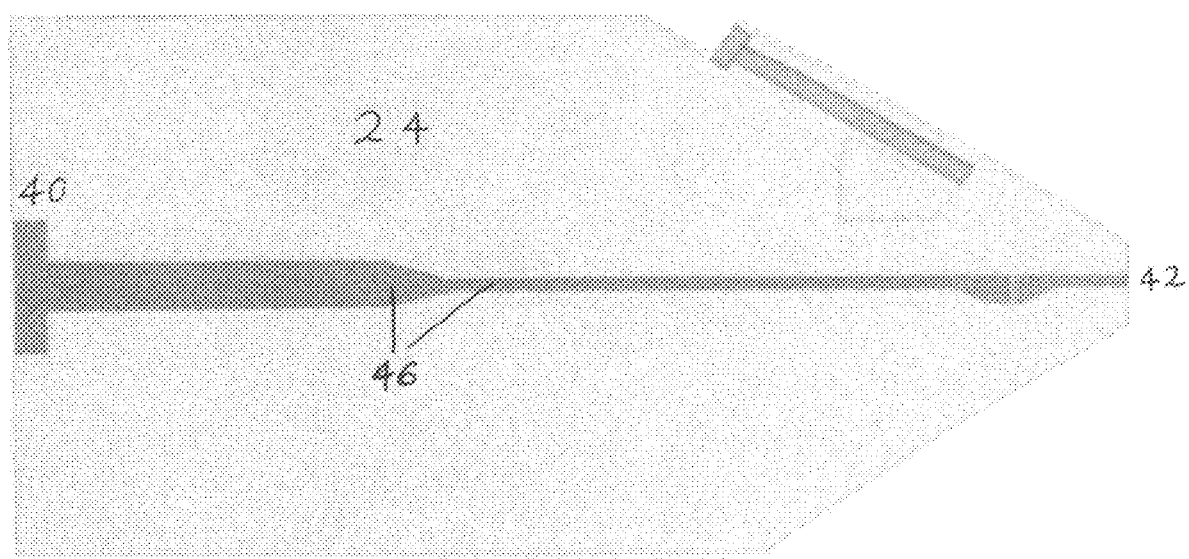
FIG. 2A is a schematic of a side view of a die used in connection with the thermoforming system of FIG. 1 according to an embodiment.
Figure 2B:
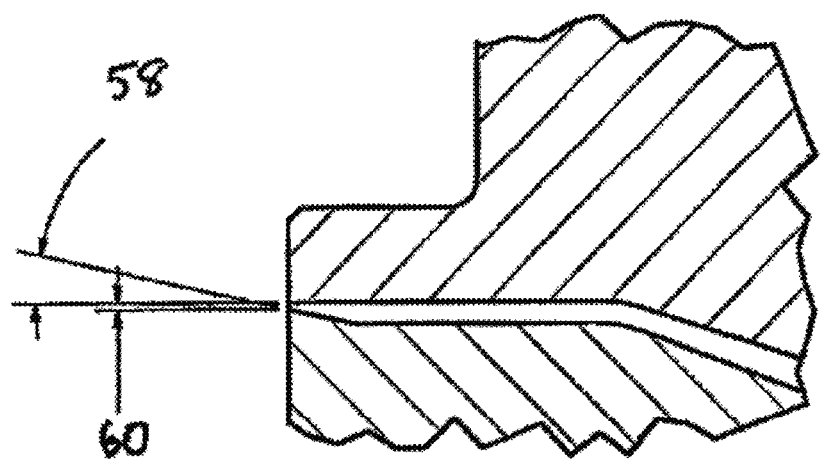
FIG. 2B is a section of the die shown in FIG. 2A.

In some embodiments the die may be in the form of a monolayer die, capable of shaping a single melt stream, whereas in other embodiments the die may be in the form of a multilayer die, capable of shaping multiple melt streams into a single co-extruded sheet. FIGS. 2A and 2B illustrate a monolayer die 24 which may be used in connection with the thermoforming system according to an embodiment. As noted above, the polymer and blowing agent stream is extruded through the die. The die includes an upstream end 40 which can be mounted to the end of the barrel and a die outlet 42 at a downstream end of the die. The die includes an inner passageway 46 which is fluidly connected the polymer processing space in the extruder and extends to the die outlet.

The passageway has a shape and dimensions (die geometry) to control the shape of the extrudate. In certain preferred embodiments, the die geometry may be selected to provide conditions that are conducive to forming the desired cell structure (e.g., low cell aspect ratio, small cell size). In embodiments that include a converging die gap, FIG. 2B the gap may converge to a dimension of less than or equal to 0.035 inch; in some cases, less than or equal to 0.010 inch; and, in some cases, less than or equal to 0.005 inch. The above-described die geometry can influence the nucleation of the cell structure in the melt stream, especially where the melt stream is a single-phase solution of polymer and blowing agent. In particular, the outward taper and converging gap construction has been observed to be very effective in creating nucleation conditions that contribute to the formation of a desired cell structure, for example, small cell size or small cell aspect ratio.

Upon exiting the die, the nucleated but not fully expanded molten polymer sheet is fed directly into a roll stack to solidify the polymer, thereby limiting the expansion of the polymer while retaining the blowing agent within the sheet. The roll stack may be of any suitable configuration known to those skilled in the art; for example, the rolls may be oriented in a vertical, inclined, horizontal or "J" configuration such as to facilitate the feed from the die into the nip of the rolls. Equally, the orientation of the die may also be arranged such as to facilitate the feed into the nip of the rolls; for example, the die may be positioned in a horizontal, vertical or angled orientation. The roll stack is such that it can be positioned at various locations in relation to the die and the nip gap can be adjusted in order to achieve the desired sheet thickness. Other parameters, for example, roll speeds and temperatures, can also be adjusted in order to achieve a blowing agent containing sheet suitable for thermoforming into the foamed articles of the present invention.

In some embodiments, the precursor sheet (or at least one layer thereof) is a microcellular foam. Microcellular foam has an average cell size of less than 100 micron. In some embodiments, the average cell size of a foam layer of the precursor sheet and/or thermoformed article is 200 micron or less (e.g., between 5 microns and 200 micron), and/or with a minimum cell density of approximately 105 cells/cubic centimeter. In some embodiments, the average cell size of the precursor sheet and/or thermoformed article may be less than 125 micron; in some embodiments, less than 100 micron; in some embodiments, less than 75 micron; and, in some embodiments, less than 50 micron.

The foam layer or layers of the precursor sheet can have a wide range of densities. For example, in some cases a polyolefin layer has a density between 0.04 g/cm3 and 0.9 g/cm3.

As noted above, the density reduction of the foam layer(s) may be between 5% and 50% as compared to the solid polymer. In some embodiments, the density reduction in the foam layer is between 10% and 40%. In some embodiments, the density reduction is between 5% and 15%. In some embodiments the foam layer has a density reduction of up to 60%.

The precursor foamed sheet includes one or more layers (e.g., 1-9 layers) including at least one foam layer. In some cases, one or more foam layers in the precursor sheet is adjacent to at least one solid polymer layer; and, in some cases, one or more foam layers is/are sandwiched between two adjacent solid polymer layers. Without being bound by any theory, it is believed that solid polymer layers may provide support to a foam layer in the sheet (e.g., an adjacent foam layer) so that the cells in the foam layer can resist collapse during thermoforming. For example, rather than collapsing, the cells can expand and/or elongate to increase in volume which results in the thermoformed article (e.g., in sections thereof) having a lower density than the precursor sheet.

In some embodiments, the precursor sheet has a 4 layer construction (e.g., ABCA in which layer A is a solid polymer layer, layer C is a polymer foam layer, and layer B is a solid polymer layer) or a 5 layer construction (e.g., ABCBA in which layer A is a solid polymer layer, layer C is a polymer foam layer, and layer B is a solid polymer layer). It should be understood that the methods described herein are not limited to any particular number of multiple layers.

In some embodiments, the foam layer(s) may have a different polymer composition than the solid polymer layer(s) in the multi-layer sheet. Though, in some embodiments, the foam layer(s) may have the same polymer composition as the solid polymer layer(s) in the multi-layer sheet.

In some embodiments the blowing agent containing precursor polymer sheet is heated above its softening temperature, typically by passing through a hot air oven although other heating methods know to those skilled in the art are also contemplated, causing the sheet to foam. The foamed sheet may be drawn through a cooling station, such as a cold water bath, a set of chilled rollers or simply air, to cool the polymer and restrict bubble nucleation and growth. In such embodiments, the temperature of the heating station as well as the rate at which the polymer sheet is drawn through the heating station and cooling station can be varied to provide sheets of varying bubble size and density. After foaming, the polymer sheet is trimmed, yielding a foamed polymer sheet which may then be thermoformed.

In some embodiments the foamed sheet is then fed directly into an accumulator just ahead of the thermoformer. The accumulator allows continuous extrusion of the gas containing sheet, and subsequent foaming of the sheet, while the material feed stops and starts within the thermoformer with each thermoformer cycle. Alternatively, the accumulator may be placed ahead of the foaming oven.

While embodiments may practice foaming simultaneously with forming, such embodiments require additional forming time to allow the material to foam, and may therefore be less adaptable to high throughput production requirements. Preferred embodiments for high throughput production requirements employ a heating station to heat the saturated polymer to a temperature suitable for both foaming and thermoforming, and then immediately thermoform the material without the need for a cooling station.

A significant result of foaming blowing agent impregnated polymer sheet according to the present invention is that the cells in the resulting polymer foam contain gas at a higher pressure than atmospheric. At the thermoforming temperature, the effect of the pressurized gas contained in these cells is to create a secondary expansion of the foam, thereby keeping the cells from buckling or collapsing. In addition, where the blowing agent has a plasticizing effect on the polymer, thermoforming temperatures may be significantly reduced as the polymer has a lower viscosity than would normally be expected for a given temperature. Furthermore, because the viscosity of the polymer is reduced, greater detail and deeper draw may be possible when thermoforming the plasticized material and, in some cases, it may be possible to thermoform articles that could not be thermoformed if polymer were not plasticized.

The plasticizing effect of the blowing agent may have additional benefits for certain semi-crystalline polymers, such as polypropylene or polyethylene terephthalate, where crystallization takes place during the foaming and thermoforming operations. Factors which typically affect the level of crystallinity in these polymers are the time, temperature and the stress levels experienced during processing. However, the presence of the blowing agent in the foamed sheet, may allow the crystallinity of the foamed sheet to be increased while still maintaining sufficient ductility for the sheet to be thermoformed.

In general, the thermoformed foam article may be formed of any suitable polymeric material, for example, thermoplastic polymers. Suitable thermoplastics include but are not limited to polyolefins, including high density polyethylene, low density polyethylene, linear low density polyethylene, metallocenes and polypropylenes, polyesters, including polyethylene terephthalate, polybutylene terephthalate and polybutylene succinate, polycarbonates, polyamides, including polyamide 6, polyamide 66, polyamide 11 and polyamide 12, crystal and high impact polystyrene, polyvinyl chloride, fluoropolymers, polylactides and polyalkanoates. Copolymers, alloys and blends of such polymeric materials are also contemplated.

The thermoformed foam article may include one or more types of additives. For example, the thermoformed article may include a nucleating agent. This nucleating agent may be selected from a number of commonly available minerals or fillers that are preferentially in the form of a particle or powder, such as calcium carbonate, magnesium hydroxide, titanium dioxide, zinc oxide, talc, nanoclay, carbon nanotubes, graphite, alumina, silica, molybdenum disulfide, immiscible polymer particles, such as rubbers, acrylics, polytetrafluoroethylene and other fluoropolymers, glass spheres, flakes and the like, metallic powders, such as aluminium, and carbon black or other inorganic pigments.

In some embodiments, at least one layer of the thermoformed article is a microcellular foam. Microcellular foam has an average cell size of less than 100 micron. In some embodiments, the average cell size of a foam layer of the thermoformed article is 200 micron or less (e.g., between 5 microns and 200 micron), and/or with a minimum cell density of approximately 105 cells/cubic centimeter. In some embodiments, the average cell size of the thermoformed article may be less than 125 micron; in some embodiments, less than 100 micron; in some embodiments, less than 75 micron; and, in some embodiments, less than 50 micron.

Careful adjustment of the thermoformer and/or design of the plug when using plug assist will enable profiling of the density reduction to different values throught the thermoformed article cross section.

Figure 3:
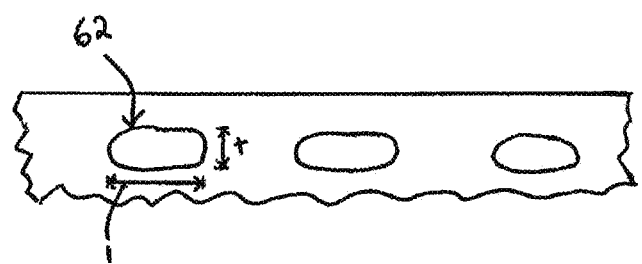
FIG. 3 is a schematic of a portion of a thermoformed article including a plurality of cells according to an embodiment.
Figure 4:
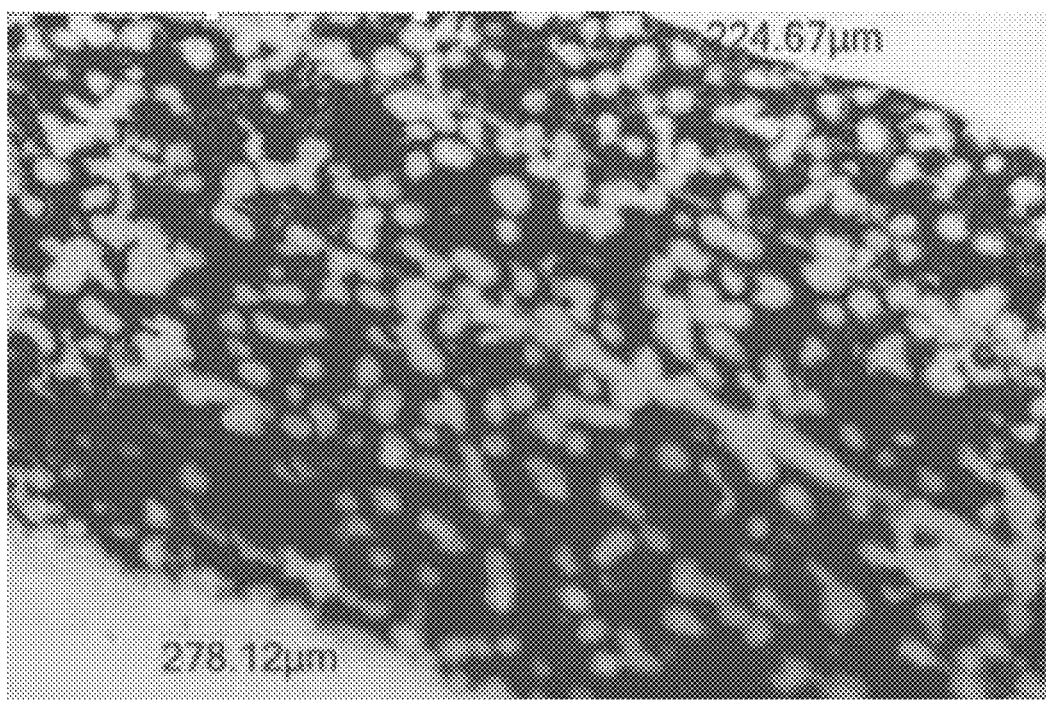
FIG. 4 shows an SEM of a thermoformed article produced according to techniques of the invention as described in the Example.

FIG. 3 is a schematic of a portion of a thermoformed foam article including a plurality of cells 62 according to an embodiment. As shown, the cells have some degree of orientation. Advantageously, the thermoformed foam article of the invention may have a small average cell aspect ratio (i.e., ratio of cell length (1) to cell thickness (t)) of less than 5:1. In some embodiments, the average cell aspect ratio may be even smaller such as less than 4:1, less than 3:1 or even less than 2:1. Such low cell aspect ratios contribute to the excellent mechanical properties that are obtainable in the thermoformed foam articles of the present invention.

In some embodiments, the thermoformed foam articles may have a substantially closed cell structure. This means that a majority of the cells are not interconnected with other cells.

In general, the thermoformed foam articles may be produced over a wide range of density, the density of the article being selected depending on the requirements of the application in which it is used. The density may be, for example, between 0.05 g/cm³ and 0.90 g/cm³. In some embodiments, the density may be between 0.40 g/cm3 and 0.60 g/cm3.

The foam layer or layers of the thermoformed article can have a wide range of densities. For example, in some cases a polyolefin layer has a density between 0.04 g/cm3 and 0.9 g/cm3.

The thermoformed article can have a density equal to or less than a density of the multi-layer precursor sheet. The density reduction of the foam layer(s) in the thermoformed articles may be between 5% and 50% as compared to the solid polymer. In some embodiments, the density reduction in the foam layer of the thermoformed article is between 10% and 40%. In some embodiments, the density reduction is between 5% and 15%. In some embodiments the foam layer in the thermoformed article has a density reduction of up to 60%.

In some embodiments, two or more different layers in the multi-layer structure may be foamed. In some embodiments, all layers in a multi-layer structure may be foamed in the precursor sheet and the thermoformed article has a lower density than the precursor sheet.

In some embodiments, the methods described herein enable deep draw thermoformed articles to be formed. A draw ratio is the ratio of the depth of the article to its opening dimension at the top. For example, the thermoformed articles may have a draw ratio of greater than 0.3. In some embodiments, the draw ratio is greater than 0.5; in some embodiments, greater than 0.7; in some embodiments, a draw ratio of greater than 1.0; in some embodiments; a draw ratio of greater than 1.5; in some embodiments, a draw ratio of greater than 2.0; in some embodiments, a draw ratio of greater than 3.0; and, in some embodiments, a draw ratio of greater than 4.0.

Advantageously, the processes described herein may enable the formation of a blowing agent containing sheet that is very uniform in thickness, allowing good consistency in the thermoforming process and resulting in a high quality thermoformed foam article. In some embodiments, the blowing agent containing sheet thickness may vary by less than +/−10% across the width of the sheet. In addition, the relatively high density of the blowing agent containing sheet is also advantageous as it is less thermally insulating than a sheet of lower density and can, therefore, be heated more quickly and more uniformly through the thickness of the sheet allowing for higher output rates.

As noted above, the thermoformed foam articles may have a number of desirable characteristics including excellent mechanical properties. The mechanical properties may include good rigidity and high strength. The thermoformed foam articles may also have good insulation properties resulting from their foam structure. The foam structure also enables materials savings as compared to solid plastic articles. The thermoformed foam articles may also have high quality surfaces which may be attractive in appearance and/or may be decorated as desired.

The desirable properties and characteristics enable the thermoformed foam articles to be used in a variety of applications. In particular, the thermoformed foam articles may be used in disposable food and beverage containers, such as coffee cups or food trays.

The function and advantage of these and other embodiments of the present invention will be more fully understood from the examples below. The following examples are intended to illustrate the benefits of the present invention, but do not exemplify the full scope of the invention.

Example

This example illustrates the production of a thermoformed polymeric foam article according to techniques of the invention.

A stream of polypropylene copolymer, (melt) density 0.91 g/cc, was created in a single screw extruder, with a L/D ratio of 32:1, equipped with air cooling. The blowing agent, nitrogen, was injected through a blowing agent port into the barrel of the extruder to form a mixture of nitrogen and molten polymer. The amount of nitrogen added was less than 1% by weight. A mineral was also added to the melt as a nucleating agent. The amount of mineral was less than 15% by weight.

Described above is the "B" layer.

In a second extruder, with an L/D ratio of 24:1, a stream of polypropylene homopolymer, melt density 0.90 g/cc, was created. No blowing agent was injected into the barrel of this extruder. This was labelled "A" layer(s). The two melts were diverted in a co-extrusion block. The "B" extruder feeds the center layer and the "A" layer split in half and fed to the outside of the "B" layer.

The ABA melt is joined in a feedblock, then the ABA structure is fed into the die, ultimately exiting the die lips. The foamed B layer is sandwiched between the 2 "A" layers.

The die head has convergence angle between 2° and 10° and the die gap is between 0.005 to 0.020". The pressure was reduced from 1200 psi in the entrance to the co-extrusion block to atmospheric (ambient) pressure at the exit of the die lip.

A three-stack roll is placed after the die with a roll temp at 50° F. This is controlled by a chiller system. The first nip roll is set to an approximate product thickness of 0.040" but pressure on the rolls is fairly low. The second nip roll is set to 0.035". When the first nip is placed 6" away from the die exit the layer ratio by volume changes from 1:1.5:1 (checked when no N2 was injected) to 1:2:1. The volume ratio is characterized by an increase in thickness. The subsequent density is 0.75 g/cc, a reduction of 18% in density.

When the roll stack is placed 1" away from the die the layer ratio by volume change from 1:1.5:1 to 1:1.6:1. The density fell from 0.91 to 0.86 g/cc. comparatively this is only a 6.5 wt % change in density however the sheet looked "solid" in nature.

From the roll stack the sheet passes through a pre heat oven and then directly into the forming station.

Samples of sheet taken before the thermoformer have a relatively uniform density reduction of 18%. Samples of product taken from the thermoformer have sections with a density reduction greater than 23%.

The invention claimed is:

1. A method for making a thermoformed polymeric foam article by a continuous process, the method comprising:
   a) conveying a mixture of a polyolefin polymeric material and blowing agent downstream in an extruder;
   b) conveying polymeric material downstream in an extruder;
   c) co-extruding the polymeric material and the mixture of polyolefin polymeric material and blowing agent in the form of a precursor sheet into atmospheric conditions wherein the precursor sheet includes at least a co-extruded solid layer and a foam layer; and
   d) heating and forming the precursor sheet into a shape to form a thermoformed article including at least a solid layer and a foam layer comprising a polyolefin polymer, wherein step (c) and step (d) are done continuously and the density of the thermoformed article is lower than the density of the precursor sheet.

2. The method according to claim 1, wherein the thermoformed article has a greater than 4:1 draw ratio.

3. The method according to claim 1, wherein the thermoformed article has a maximum wall thickness of less than 3 mm.

4. The method according to claim 1, wherein the thermoformed article has a density reduction of less than 35%.

5. The method according to claim 1, wherein the precursor sheet includes more than one foam layer.

6. The method according to claim 1, wherein the thermoformed article comprises one or more layers of microcellular polymer foam material.

7. The method according to claim 1, wherein the thickness of the article is greater than the thickness of the precursor sheet.

8. The method according to claim 1, wherein the thickness of the article is at least 20% greater than the thickness of the precursor sheet.

9. The method according to claim 1, wherein the thickness of the article is at least 10% greater than the thickness of the precursor sheet.

10. The method according to claim 1, wherein the thickness of the article is at least 5% greater than the thickness of the precursor sheet.

11. The method according to claim 1, wherein the polymer foam layer of the precursor sheet has an average cell size of less than about 200 micron.

12. The method according to claim 1, wherein the polymer foam layer of the multi-layer precursor sheet has a cell size less than about 50 micron.

13. The method according to claim 1, wherein the thermoformed article has a draw ratio of greater than 2.0.

14. The method according to claim 1, wherein the polymer foam layer of the thermoformed article has a density reduction of at least 5% compared to the solid polymer.

15. The method according to claim 1, wherein the polymer foam layer of the thermoformed article has a density reduction of at least 20% compared to the solid polymer.

* * * * *